May 9, 1967
R. LOESER
3,318,249
SUBMERSIBLE DRIVE APPARATUS
Filed Aug. 5, 1965
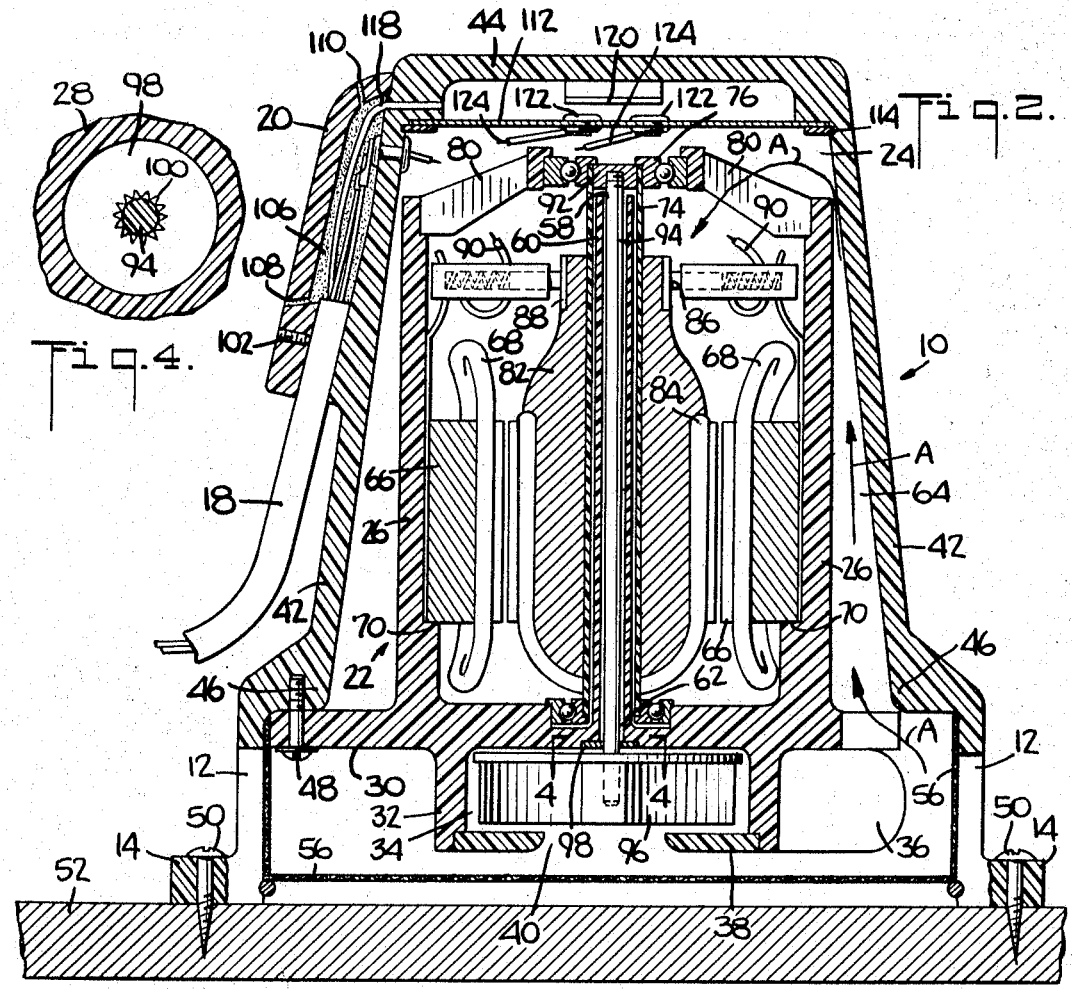
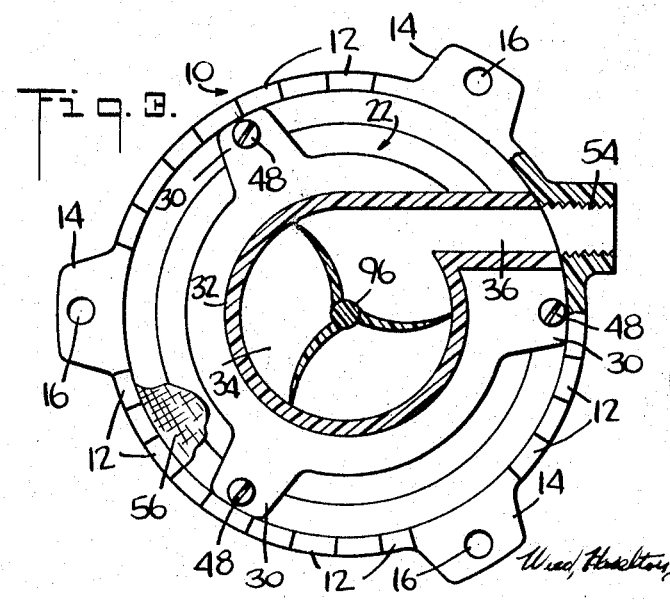
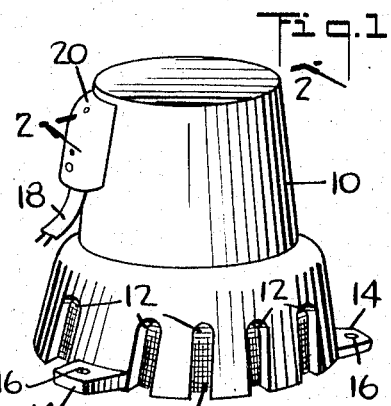
INVENTOR.
ROBERT LOESER
BY
ATTORNEYS United States Patent Office 3,318,249
Patented May 9, 1967

3,318,249
SUBMERSIBLE DRIVE APPARATUS
Robert Loeser, 1005 E. Glen Ave.,
Ridgewood, N.J. 07450
Filed Aug. 5, 1965, Ser. No. 477,551
21 Claims. (Cl. 103—25)

This invention relates to the protection of drive mechanisms while submerged, and more particularly it concerns a novel motor housing arrangement for use with submersible pumps and the like.

There are many instances, as in the case of submersed pumps and mixers, where mechanical power must be transmitted through the walls of a submerged housing. Also, where the pump or mixer is electrically powered, it is particularly important that no leakage occur where the motor drive shaft extends through the housing, otherwise dangerous short circuiting may result.

By and large, the drive shafts of submersible devices have been sealed by means of fibrous or plastic seals which are mounted in the housing wall and which frictionally engage the shaft while allowing it to rotate and/or reciprocate. These seals however, inevitably allow a certain amount of leakage; and they usually wear out quite rapidly. Also, their frictional engagement with the moving shaft imposes an additional load on the system.

Another difficulty associated with known submersible housings for protecting the drive motors, etc. of pumps and similar devices is that they must be provided with a removable cover so that periodic checks and repairs can be made to the internal components. In many instances, the gasket used to seal the housing cover in place begins to leak after the device has been submerged for prolonged periods. Since any leakage could produce a very dangerous condition in the electrical portion of the system, it has previously been necessary to shut down the device after relatively short intervals to check the gasket and replace it when necessary.

While many attempts have been made in the past to solve the above described problems, none has been entirely satisfactory. Most prior attempts have resulted in a housing configuration and a shaft drive mechanism which was unduly complicated. In some cases, belts and pulleys have been used as a means for isolating the drive motor from the shaft opening in the housing. This, however, has complicated the system and has greatly increased the size of the housing.

The present invention has overcome all of the above described as well as other problems. According to the present invention, there is provided a simple and very inexpensively constructed submersible housing which permits the transmission of mechanical power over long durations without leakage. This novel housing is entirely devoid of seals and gaskets; yet it provides complete and dependable protection to the various components located therein.

In one of its aspects the present invention involves a housing formed with an internal chamber in which are mounted various internal components to be protected. Means such as a vertical tube, are provided to define a first vertical passageway extending up through the bottom of the housing to a location up inside the internal chamber. Further means, such as an outer cover configuration, are provided to define a second separate pasageway of substantial cross-section. This second passageway, like the first, also extends in a vertical direction up through the bottom of the housing to a location up inside the internal chamber. A drive shaft extends through the first passageway and transmits mechanical power between components exterior and interior to the housing.

Since the only openings in the housing are located at the bottom thereof, the atmosphere or air which is inside the internal chamber, becomes trapped therein and thus prevents water from entering into the chamber. Also, the second passageway, being of substantial cross-section, serves to reduce the changes in water level in both passageways which occur with volumetric changes of the air in the internal chamber. Thus, whenever the air in the chamber becomes cooled, or when the pressure of the water acting on it increases, the resulting volume decrease of the chamber air is accommodated by an equal rise of water in each of the two vertical passageways; and since the total cross-section of the two passageways is quite substantial, the total rise of water is kept to a minimum.

In another of its aspects the present invention involves the integration of an electrical drive motor with a submersible housing in a novel arrangement. According to this aspect of the invention, the housing, having an internal chamber, is provided with an internal tubular element forming a passageway which extends up through the bottom of the housing to a location near the top of the internal chamber. An electric motor rotor, having a hollow shaft, is fitted over the tubular element and is mounted to rotate about the element. A drive shaft passes through the tubular element and is connected above the element to the upper end of the rotor. A stator is provided for the motor and is mounted within the housing in cooperative positional relationship with the rotor. As the rotor turns, it rotates the drive shaft. No seal is provided between the tubular element and the drive shaft; and although water may rise up in the tubular element about the drive shaft and within the rotor shaft, the rotor itself remains fully protected and safe from water damage and short circuit.

In an illustrative embodiment, described more fully hereinafter, the present invention makes use of two generally cup shaped housing members, the first mounted upright and the second inverted and enveloping the first. A hollow tubular element extends through the bottom of and up inside the first or inner housing member. A drive shaft extends through the tubular element. An electric motor is provided within the first housing member. This motor has a hollow rotor which fits over and turns about the tubular element as above described. The two housing members are dimensioned so that the outer one fits loosely over the inner one to define an annularly shaped second vertical passageway as above described. This makes for a simple and easily fabricated structure.

As will be seen in the following detailed description of the illustrative embodiment, the present invention permits of reliable and automatic control of motor operation based upon the effect of water level pressure upon the atmosphere within the housing of the device. Such control is accomplished through the provision of a pressure actuated switch; and, as illustratively embodied, this comprises a flexible air impermeable diaphragm which extends across the upper portion of the interior of the housing and which carries switch contacts for completing a connection to the drive motor when the diaphragm flexes by a given amount.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a perspective view of a pumping apparatus embodying the present invention;

FIG. 2 is an enlarged section view, taken in elevation, along line 2—2 of FIG. 1;

FIG. 3 is a section view taken along line 3—3 of FIG. 2; and

FIG. 4 is a view taken along line 4—4 of FIG. 2.

The pump arrangement shown in FIG. 1 is formed with a cup or bell shaped outer housing member 10. The lower portion of the housing member is formed with a plurality of intake openings 12 into which flows the water or other liquid to be pumped. Mounting flanges 14 are formed about the bottom edge of the outer housing member 10, and these are provided with holes 16 for bolting or screwing the pump to any solid surface, for example the bottom of a bilge. A cable 18 transmits electrical power from a remote location in through a subhousing 20 formed near the top of the outer housing 10.

FIG. 2 shows the internal configuration of the pump arrangement. Inside the outer housing member 10 there is provided an upright cup shaped inner housing member 22.

The outer housing member 10 is dimensioned to fit over and envelop the inner housing member 22, thus forming an internal chamber 24. Both housing members are made of some waterproof material such as plastic, and may be easily and inexpensively molded.

The inner housing member 22 includes a vertical cylindrical wall 26 which is open at the top and which is closed at the bottom by a horizontal floor 28. The floor 28 extends out beyond the vertical wall 26 at various locations to form flanges 30 (see FIG. 3) at which it is secured to the outer housing 10.

A lower cylindrical wall 32 extends vertically downward a short distance from the underside of the floor 28 and forms the side walls of an impeller housing 34. As shown in FIG. 3, this impeller housing is shaped to provide a horizontally extending output passageway 36 which extends out through the side of the device. The impeller housing 34 is completed by a washer shaped disk 38 of plastic or similar material which fits up against the bottom end of the lower cylindrical wall 32. The disk 38 has a central opening 40 which provides the pump input.

The outer housing member 10 includes a slightly tapered, or bell shaped outer wall 42 which is open at the bottom and which is closed at the top by a horizontal top wall 44. The interior of the outer housing is dimensioned to fully accommodate the inner housing member 22. Also the outer wall 42 is shaped with a step 46 to which the flanges 30 of the inner housing member are fastened by means of bolts or screws 48. The lower portion of the outer housing member extends down from the step 46 beyond the lower end of the impeller housing 34; and, as stated, the mounting flanges 14 extend outwardly from the lower edge of the member so that the entire unit may be fastened, as by screws 50 to a mounting surface 52.

The portion of the outer housing member 10 below the step 46 extends downwardly therefrom by an amount sufficient to completely enclose the impeller housing 34; and as stated above, this lower portion is provided with a plurality of intake openings 12 which allow water to flow into and fill the entire region about the impeller housing. There is also provided an output opening 54 through which the output passageway 36 extends. A tray like screen 56 fits within the lower portion and prevents debris or other foreign matter from being drawn into the pump itself.

Means are provided for defining a first passageway 58 which opens out to the bottom of the dual housing structure and which extends to a point up in the internal chamber 24. This means comprises a vertical tube 60 which is integrally attached at its lower end to the floor 28 of the inner housing member 22. This tube 60 opens out through a central opening 62 in the bottom of the floor into the impeller housing 34.

Means are also provided for defining a second passageway 64 which opens out to the bottom of the housing structure and which also extends to a point up in the internal chamber 24. This second means includes the vertical cylindrical wall 26 of the inner housing member 22 and the outer wall 42 of the outer housing 10. These walls are dimensioned to define an annular space between them constituting the second passageway 64. This second passageway, like the first passageway 58, also extends (as shown by the arrows A), up from the bottom of the device and into the inner chamber 24.

An electrical motor is provided within the inner chamber 24. This motor includes a stator core 66 and winding 68 arranged about the interior of the vertical cylindrical wall 26 and mounted on a step 70 formed therein. A rotor 72, having a hollow shaft 74, is mounted with its hollow shaft encompassing the vertical tube 60. Upper and lower rotor bearings 76 and 78, are provided for mounting the rotor 72 so that it can rotate about with the vertical tube 60 without actually touching or stressing it. As shown in the drawing, the upper bearing 76 is secured by means of a spider like structure 80 which extends from the top edges of the vertical cylindrical walls 26 of the inner housing member 22. The lower bearing 78 is merely mounted in the horizontal floor 28 of inner housing member. The rotor 72, of course, is provided with a core 82 and windings 84 which rotate within the stator core and windings 66 and 68. A pair of brushes 86 are mounted within the inner housing member 22 above the stator assembly; and there are spring biased to maintain electrical contact with commutator elements 88 about the upper end of the rotor. A pair of wires 90 are connected to supply electrical power to the brushes and windings of the motor.

The upper end of the hollow rotor shaft 74 is attached by means of an electrically insulative connector element 92 to the upper end of a drive shaft 94 which extends through the vertical tube 60. A three bladed centrifugal type pump impeller 96 is connected to the lower end of the drive shaft 94 to be turned thereby within the impeller housing 34. A lower drive shaft bearing 98 is provided at the lower end of the drive shaft to maintain its alignment during rotation. This bearing, as shown in FIG. 4, is generally washer shaped, but is starred internally as it 100 to reduce friction and to permit the free flow of water into and out of the vertical tube 60. The electrically insulative connector element 92 serves to prevent stray electrical current from passing down the drive shaft 94 and into the water being pumped.

Electrical power is supplied to the device via the cable 18 which enters into the subhousing 20 formed in the side of the otuer housing member 10. The cable 18 is secured in place by means of a setscrew 102. The outer cable covering terminates within the subhousing 20 while the various wires, etc. therein, proceed through openings 104 into the internal chamber 24. In order to ensure that water tightness will be maintained, the subhousing cavity is filled with a sealer compound 106 of a waterproof material, such as plastic, which may be injected through an opening 108 provided for that purpose. A vent opening 110 is also provided to facilitate this injection.

The various wires entering the housing structure include, of course, the pair of wires 90 which supply electrical power to the pump motor.

During operation, the apparatus may be either partially or fully submerged, so long as the water level is sufficient to pass through the intake openings 12 and reach the impeller 96. Electrical power, supplied via the cable 18, causes the rotor 72 to turn on its bearings 76 and 78. This rotation is communicated via the connector element 92 to the drive shaft 94, which in turn drives the pump impeller 96. Water is drawn in through the intake openings 12 and the central opening 40 of the impeller housing 34 to the impeller 96. The rotating impeller then forces the water out through the output passageway 36 and through a tube (not shown) to a remote location for discharge.

Although the surrounding water level may rise and even submerge the entire pump, the air trapped inside the chamber 24 will prevent the water from entering into the pump housing. There will, of course, be a slight rise in the water level in the first and second vertical passageways 58 and 64. This is because the air inside the chamber 24 is a compressible medium and the increased pressure caused by the higher surrounding water level will squeeze the air within the housing a certain small amount. However, the motor and the various electrical connections will remain dry even should this effect bring the water level up to the level of the rotor 72; for these elements are isolated from the passageways by the cylindrical wall 26 and the vertical tube 60 of the inner housing member 22. Thus the present arrangement permits the drive motor to be mounted in very close proximity to the pump impeller while remaining isolated therefrom in regard to the liquid being pumped. Also the pump impeller can be driven directly without need of intermediate belts, pulleys, gears and associated apparatus.

Although changes in water temperature as well as changes in water pressure may cause a decrease in air volume within the internal chamber 24, this entire volume change will not, in the present case, be accommodated by the rush of water up through the vertical tube 60 and into the internal chamber. This is prevented by the annularly shaped second passageway 64 defined between the two housings and communicating between the internal chamber 24 and the bottom of the device. Because this second passageway is of substantial cross-sectional area (significantly greater than the cross-sectional area of the vertical tube 60), any change in air volume within the internal chamber 24 will be accommodated by a flow or rise of water in both the first passage 58 (the tube 60) and the second passage 64 (between the outer and inner housing members 10 and 22). Because of the greatly increased cross-sectional area brought about by the second passage 64, any given volume change will be accommodated by a very much decreased rise in water level in both of the passages. It will be noted that the tapered or bell shaped configuration of the outer housing member provides a maximum cross-sectional area to the annularly shaped second passageway, especially near its bottom, thus minimizing the change in water level for given changes in volume of the air within the chamber 24.

It will be noted that no gaskets or seals of any kind are used in the present arrangement and yet it provides a reliable watertight protective covering for the electrical drive motor. Moreover, the housing members individually are of simple configuration lending themselves well to conventional plastic molding techniques. There are no critical dimensions to be maintained and the amount of material required in them is not excessive. Also, the present arrangement eliminates the need for a separate motor housing, the stator being mounted directly to the vertical cylindrical wall 26 of the inner housing 22. The motor drive is direct, and therefore is simple in construction and operation, requiring fewer bearings than conventional drives and, requiring no belts, pulleys, gears and related equipment such as is found in conventional systems. The outer housing member 10 may be removed simply by loosening the fastening bolts 48. This immediately exposes the entire internal structure for convenient inspection and repair where necessary.

It will be noted also that due to the present arrangement and configuration of the housing members, the apparatus may safely undergo tilting by as much as 30 to 40 degrees off vertical without danger of leakage. This is an important feature in connection with use on boats and similar environments where tilting is likely to occur.

A further feature of the present invention lies in its adaptability to safe and automatic switching for turning on the pump when the surrounding water reaches a given level. As indicated above, the air within the internal chamber 24 is subject to the compressive effects of the surrounding water; so that as the level of this surrounding water rises, it exerts greater pressure on the air within the chamber. This increased pressure is made use of to turn the pump on and maintain it in operation until it has pumped the surrounding water out of the bilge or other location down to a desired level.

In the present arrangement, there is provided a flexible diaphragm 112 across the interior of the outer housing member 10 just below its top wall 44. This diaphragm is cemented in place and secured by a lock ring 114. The space above the flexible diaphragm 112 is vented through an opening 116, and a vent tube 118 running through the cable 18 to the outer atmosphere. Thus the upper side of the diaphragm 112 is subject to atmospheric pressure alone while its lower side is subject to atmospheric pressure plus the pressure exerted by the water above the pump. As the surrounding water level rises, the pressure differential across the diaphragm increases and it bulges upwardly.

A stationary electrical conductor 120 is mounted on the top wall 44 of the outer housing member just above the diaphragm 112. A pair of electrical contacts 122 extend through and are carried by the diaphragm. Wires 124 are carried by these contacts; and when the diaphragm bulges upwardly, the contacts 122 press on the conductor 120 and establish electrical contact with each other and the wires 124. The wires 124 can be connected in series with the wires 90 supplying electrical power to the motor; or, if it is preferred not to have the entire electrical current flow through the contacts 122 and conductor 120, the wires 124 may be connected through the cable 18 to a remotely mounted relay which in turn operates a switch to supply power via the wires 90 directly to the pump motor.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A submersible drive apparatus comprising an inner cup shaped housing with a closed bottom and an open top, an outer cup shaped housing having a closed end, said outer housing being inverted over the open end of said inner housing and enveloping same, means securing said housings together in a manner admitting fluid communication to the interior of said inner housing via the clearance existing between said housings, drive means located within said inner housing and means transmitting the output of said drive means outside said housings.

2. A submersible drive apparatus as in claim 1 wherein said means transmitting the output of said drive means comprises a tubular portion extending up inside said inner housing from the bottom thereof, one end of said tubular portion opening out through the closed bottom end of said inner housing and a shaft extending through said tubular portion and connected to said drive means at the other end of said tubular portion.

3. A submersible drive apparatus as in claim 2 wherein said drive means comprises an electrical motor having a hollow rotor mounted to turn about said tubular portion and connected at one end to said shaft.

4. A submersible drive apparatus comprising an inner cup shaped housing member formed with an inner tubular portion extending upwardly therein, one end of said inner tubular portion opening toward the open, top end of said inner housing, the other end of said inner tubular portion opening out through the bottom closed end of said inner housing, an outer cup shaped housing member inverted over and enveloping said inner housing member, means fastening said housing members together, a shaft extending up through said tubular portion, and shaft drive means located within said inner housing member and connected within said housings to drive said shaft.

5. A submersible drive apparatus as in claim 4 wherein said inner and outer housings are dimensioned such that the cross sectional area of the clearance between them is substantially larger than the cross sectional area of the clearance between said tubular portion and said drive shaft.

6. A submersible drive apparatus as in claim 4 wherein said fastening means is arranged to allow the clearance between said inner and outer housings to open out at the open end of said outer housing.

7. A submersible drive apparatus comprising a housing of fluid impermeable material having an internal chamber formed therein for containing a shaft drive mechanism to be protected, means defining a first passageway opening to and extending up from the exterior of the bottom of said housing to a point up in said internal chamber and opening therein, shaft means extending through said first passageway for interconnecting said shaft drive mechanism with external utilization means, and means defining a second passageway separate and distinct from said first passageway and of extensive cross-section, said second passageway also extending up from the exterior of the bottom of said housing to a point up in said internal chamber and opening into said interior chamber whereby volumetric variations of the atmosphere within said internal chamber are accommodated in said second passageway to prevent the flow of liquid into said chamber through said first passageway, said housing being otherwise closed.

8. A submersible drive apparatus as in claim 7 wherein said second passageway is of greater cross-sectional area than said first walled passageway.

9. A submersible drive apparatus as in claim 7 wherein said second passageway is of annular configuration and surrounds said first passageway.

10. A submersible drive apparatus comprising a housing of fluid impermeable material, said housing being formed with an internal chamber and a bottom opening leading into said internal chamber, a shaft tube positioned interiorly of said chamber and extending in an upward direction from said bottom opening to a location up in said chamber, a drive motor located within said interior chamber, said drive motor having a hollow rotor fitted over and mounted to rotate about said shaft tube, a drive shaft extending through said tube with one end protruding out through said bottom opening and its other end connected to said hollow rotor, said shaft tube defining a first walled passageway leading into said internal chamber, means defining a second walled passageway separate and distinct from said shaft tube and of extensive cross-section, said second walled passageway also extending up from the exterior of the bottom of said housing to a point up in said internal chamber, and opening into said interior chamber whereby volumetric variations of the atmosphere within said interior chamber are accommodated in said second passageway to prevent the flow of liquid into said chamber through said shaft tube, said housing being otherwise closed.

11. A submersible drive apparatus comprising an inner cup shaped housing member opened at the top and having a bottom wall with a central opening therethrough, a tubular element extending from said central opening up into said inner cup shaped housing member, an outer cup shaped housing member inverted over and enveloping said inner housing member, said outer housing member being arranged to define between the inner and outer housing members an annularly configured vertical passageway of substantial cross-section communicating with the interior of said inner housing member near the top thereof, said housings being otherwise closed, an electrical drive motor having a stator affixed inside the walls of said inner housing member and further having a hollow rotor fitted over and mounted to rotate about said tubular element, a drive shaft extending through said tubular element with one end protruding out through said central opening and adapted to be connected to utilization means, and means connecting the other end of said drive shaft to said rotor at a location within said housing members above said tubular element.

12. A submersible drive apparatus comprising an inner cup shaped housing member having a cylindrical peripheral wall and a bottom wall, a tubular element extending along within said inner housing member and opening out through said bottom wall, a bell shaped outer housing member closed except at its bottom and extending over and enveloping said inner housing member, said outer housing member being of such dimensions as to define between the inner and outer housing members an annularly configured vertical passageway of substantial cross-section, a shaft extending up through said tubular portion, shaft drive means located within said inner housing member and connected to drive said shaft at the end thereof within said outer housing, the other end of said shaft being adapted to be connected to utilization means.

13. A submersible drive apparatus comprising a housing structure defining an internal chamber, means defining a pair of passageways extending from the bottom of said housing and communicating with said internal chamber, said housing structure being otherwise completely closed, one of said passageways being of substantial cross-section, shaft means extending up through the other of said passageways, and drive means located within said internal chamber and connected to actuate said shaft means.

14. A submersible drive apparatus comprising a housing structure defining an internal chamber, means defining a pair of passageways extending from the bottom of said housing and communicating with said internal chamber, said housing being otherwise completely closed, one of said passageways being of substantial cross-section, shaft means extending up through the other of said passageways, drive means located within said internal chamber and connected within said chamber to actuate said shaft means, and pressure operated switch means mounted within said internal chamber and connected to initiate operation of said drive means in response to a preselected pressure within said internal chamber.

15. A submersible drive apparatus comprising an inner cup shaped housing member formed with a tubular portion opening out on the bottom thereof and extending upwardly therein, an outer cup shaped housing member inverted over and enveloping said inner housing member, said outer housing member being of such dimensions as to define between the inner and outer housing members an annularly configured vertical passageway of substantial cross-section, a shaft extending up through said tubular portion, an electrical motor located within said inner housing and connected to drive said shaft at the end thereof which extends into said inner cup shaped housing member, pressure sensitive switch means located within said housing members and including a flexible diaphragm arranged to be contorted by the pressure within said housing members, first electrical contact means carried by said flexible diaphragm, second electrical contact means fixed with respect to said housing and positioned to be contacted by said first contact means upon the contortion of said flexible diaphragm, electrical circuit means including said electrical contacts and arranged to place said electrical motor into circuit with an electrical power source by closure of said contact means upon the occurrence of a preselected pressure within said housing members.

16. A submersible drive apparatus as in claim 15 wherein said flexible diaphragm extends across said outer housing member above said inner housing member.

17. A submersible drive apparatus as in claim 16 wherein said first electrical contact means comprises a pair of electrically conductive contact elements extending through said diaphragm and connected, below said diaphragm, into said electrical circuit and said second electrical contact means comprises an electrical conductor above said diaphragm and extending sufficiently to be contacted by both said contact elements upon contortion of said diaphragm.

18. A submersible drive apparatus as in claim 16 wherein said outer housing above said flexible diaphragm is arranged to be vented to the outer atmosphere.

19. A submersible drive apparatus as in claim 18 and including a vent tube communicating between the atmosphere and the region within said outer housing member above said flexible diaphragm.

20. A submersible drive apparatus comprising an inner cup shaped housing member opened at the top and having a bottom wall with a central opening therethrough, a tubular element extending up from said central opening up into said inner cup shaped housing, an outer cup shaped housing member inverted over and enveloping said inner housing member, said outer housing member being arranged to define between the inner and outer housing members an annularly configured vertical passageway of substantial cross-section communicating with the interior of said inner housing near the top thereof, an electrical drive motor having a stator affixed to the inside walls of said inner housing member and further having a hollow rotor fitted over and mounted to rotate about said tubular element, a drive shaft extending through said tubular element with one end protruding out through said central opening and adapted to be connected to utilization means, means connecting the other end of said drive shaft to said rotor at a location within said housing members above said tubular element, and a pressure sensitive switch including a flexible diaphragm extending across the interior of said outer housing member above said inner housing member, a pair of electrical contact elements extending through and carried by said flexible diaphragm, an electrical conductor fixed to said outer housing member above said diaphragm and shaped and positioned to be contacted simultaneously by both said electrical contact elements upon the flexing of said diaphragm, and electrical circuit means including said electrical contact elements and said electrical conductor and arranged to place said electrical motor into operation upon the establishment of electrical connection between said electrical contact elements.

21. A submersible electrically driven pump comprising an inner cup shaped housing member opened at the top and having a bottom wall with a central opening therethrough, a tubular element extending up from said central opening up into said inner cup shaped housing, an outer cup shaped housing member inverted over and enveloping said inner housing member, said outer housing member being arranged to define between the inner and outer housing members an annularly configured vertical passageway of substantial cross-section communicating with the interior of said inner housing near the top thereof, an electrical drive motor having a stator affixed to the inside walls of said inner housing member and further having a hollow rotor fitted over and mounted to rotate about said tubular element, a drive shaft extending through said tubular element with one end protruding out through said central opening, a pump rotor connected to be driven by the other end of said shaft external to said housing members, means connecting the other end of said drive shaft to said rotor at a location within said housing members above said tubular element, and a pressure sensitive switch including a flexible diaphragm extending across the interior of said outer housing member above said inner housing member, a pair of electrical contact elements extending through and carried by said flexible diaphragm, an electrical conductor fixed to said outer housing member above said diaphragm and shaped and positioned to be contacted simultaneously by both said electrical contact elements upon the flexing of said diaphragm, and electrical circuit means including said electrical contact elements and said electrical conductor and arranged to place said electrical motor into operation upon the establishment of electrical connection between said electrical contact elements.

References Cited by the Examiner
UNITED STATES PATENTS

| | | | |
|---|---|---|---|
| 2,107,481 | 2/1938 | Johnson | 103—102 |
| 2,739,536 | 7/1956 | Schaefer | 103—26 |
| 2,936,774 | 5/1960 | Holley et al. | |
| 3,010,401 | 11/1961 | Granquist | 103—25 |

FOREIGN PATENTS 880,548  6/1953  Germany.

ROBERT M. WALKER, *Primary Examiner.*